United States Patent
Snowbarger et al.

(10) Patent No.: US 11,406,180 B2
(45) Date of Patent: Aug. 9, 2022

(54) TABLE POWER MODULE DEVICES, SYSTEMS, AND METHODS

(71) Applicant: Halcon Corp., Stewartville, MN (US)

(72) Inventors: Jacob Edward Snowbarger, Rochester, MN (US); Benjamin Saintmane Conway, Rochester, MN (US); Eliot Curtis Bublitz, Rochester, MN (US)

(73) Assignee: Halcon Corp., Stewartville, MN (US)

( * ) Notice: Subject to any disclaimer, the term of this patent is extended or adjusted under 35 U.S.C. 154(b) by 688 days.

(21) Appl. No.: 16/430,906

(22) Filed: Jun. 4, 2019

(65) Prior Publication Data

US 2020/0383470 A1 Dec. 10, 2020

(51) Int. Cl.
*A47B 21/06* (2006.01)
*H01R 25/00* (2006.01)
*H01R 13/66* (2006.01)
*H02J 7/00* (2006.01)

(52) U.S. Cl.
CPC ........... *A47B 21/06* (2013.01); *H01R 13/665* (2013.01); *H01R 25/006* (2013.01); *H02J 7/00* (2013.01); *A47B 2021/066* (2013.01); *A47B 2200/008* (2013.01)

(58) Field of Classification Search
CPC .............. A47B 21/06; A47B 2021/066; A47B 2200/008; H02B 1/015; H02G 3/081; H05K 5/00; H05K 5/02; H05K 5/03
USPC ......... 108/50.01, 50.02; 174/500; 312/223.6, 312/223.2, 223.1, 223.3
See application file for complete search history.

(56) References Cited

U.S. PATENT DOCUMENTS

| | | | |
|---|---|---|---|
| 1,690,286 A | 11/1928 | Fitch | |
| 1,810,579 A | 6/1931 | Schmitz | |
| 2,646,325 A | 7/1953 | Abrahamson | |
| 3,115,108 A | 12/1963 | Craddock | |
| 4,117,782 A | 10/1978 | Cahill | |
| 4,558,553 A | 12/1985 | Kolk | |
| 4,946,727 A | 8/1990 | Kessler | |
| 5,057,039 A * | 10/1991 | Persing | H01R 13/73 248/231.71 |
| 5,230,552 A * | 7/1993 | Schipper | A47B 21/06 108/26 |
| 5,479,864 A | 1/1996 | Kemp | |
| 5,709,156 A * | 1/1998 | Gevaert | H02G 3/18 108/26 |
| 5,971,509 A * | 10/1999 | Deimen | H02G 3/0437 108/26 |
| 6,025,047 A | 2/2000 | Catta et al. | |
| 6,058,851 A | 5/2000 | Alexander | |
| 6,234,812 B1 * | 5/2001 | Ivers | H01R 25/006 439/378 |
| 6,378,831 B1 | 4/2002 | Copeland, Jr. | |
| 7,312,393 B2 * | 12/2007 | McCarthy | H01R 25/006 174/53 |

(Continued)

OTHER PUBLICATIONS

DatesWeiser, Highline Brochure, 2017, retrieved from: http://www.datesweiser.com/assets/DatesWeiser_Highline_Brochure_2017.pdf.

*Primary Examiner* — Jose V Chen
(74) *Attorney, Agent, or Firm* — Fish & Richardson P.C.

(57) ABSTRACT

A table system power module is provided. In some embodiments, an example table system includes a table top and a power module removably mounted to the table top. The power module includes a contact surface made from a relatively softer material.

20 Claims, 5 Drawing Sheets

(56) References Cited

U.S. PATENT DOCUMENTS

| | | | |
|---|---|---|---|
| 7,626,120 B1* | 12/2009 | Golden | H02G 3/0493 |
| | | | 174/53 |
| 7,748,106 B1 | 7/2010 | Kinnard et al. | |
| 7,966,951 B1* | 6/2011 | Black | H02G 3/128 |
| | | | 108/50.01 |
| 8,182,031 B1 | 5/2012 | MacKenzie | |
| 8,785,771 B2* | 7/2014 | Dunkleberger | H04L 12/2829 |
| | | | 361/728 |
| 8,794,997 B2* | 8/2014 | Tin | H02J 1/00 |
| | | | 439/535 |
| 9,681,747 B1 | 6/2017 | Pectol | |
| 10,799,877 B2* | 10/2020 | Ward | B02C 21/02 |
| 2002/0046852 A1* | 4/2002 | King | A47B 21/06 |
| | | | 174/500 |
| 2003/0185515 A1* | 10/2003 | Lubkert | H01R 25/006 |
| | | | 385/75 |
| 2004/0147147 A1* | 7/2004 | Griepentrog | H01R 13/447 |
| | | | 439/131 |
| 2006/0102054 A1 | 5/2006 | Warriner | |
| 2007/0040483 A1 | 2/2007 | Arkay-Leliever | |
| 2008/0061662 A1* | 3/2008 | Lin | A47B 21/03 |
| | | | 361/679.08 |
| 2008/0121147 A1* | 5/2008 | Cooke | H02G 3/185 |
| | | | 108/50.02 |
| 2009/0165680 A1* | 7/2009 | Bakker | A47B 21/06 |
| | | | 108/50.02 |
| 2010/0064945 A1 | 3/2010 | Sierenberg | |
| 2010/0227498 A1* | 9/2010 | Byrne | A47B 21/06 |
| | | | 439/528 |
| 2011/0155023 A1* | 6/2011 | Krause | A47B 21/06 |
| | | | 108/26 |
| 2011/0163510 A1 | 7/2011 | Wedi | |
| 2011/0177703 A1* | 7/2011 | Lin | H01R 25/006 |
| | | | 439/131 |
| 2013/0305966 A1 | 11/2013 | Hendershot | |
| 2014/0265753 A1* | 9/2014 | Soper | A47B 21/06 |
| | | | 312/22 |
| 2015/0008805 A1* | 1/2015 | Kramer | A47B 21/06 |
| | | | 312/24 |
| 2016/0022031 A1* | 1/2016 | Scott | G06F 1/181 |
| | | | 108/50.02 |
| 2017/0156490 A1* | 6/2017 | Newhouse | A47B 21/06 |
| 2017/0251806 A1* | 9/2017 | Newman | A47B 9/20 |
| 2018/0287322 A1* | 10/2018 | Hayes | A47B 9/00 |
| 2018/0358765 A1* | 12/2018 | Byrne | H01R 13/73 |
| 2019/0148874 A1* | 5/2019 | Sorrentino | H01R 13/5213 |
| | | | 439/136 |
| 2020/0077786 A1* | 3/2020 | Conway | A47B 21/06 |
| 2020/0329863 A1* | 10/2020 | Conway | A47B 21/06 |

* cited by examiner

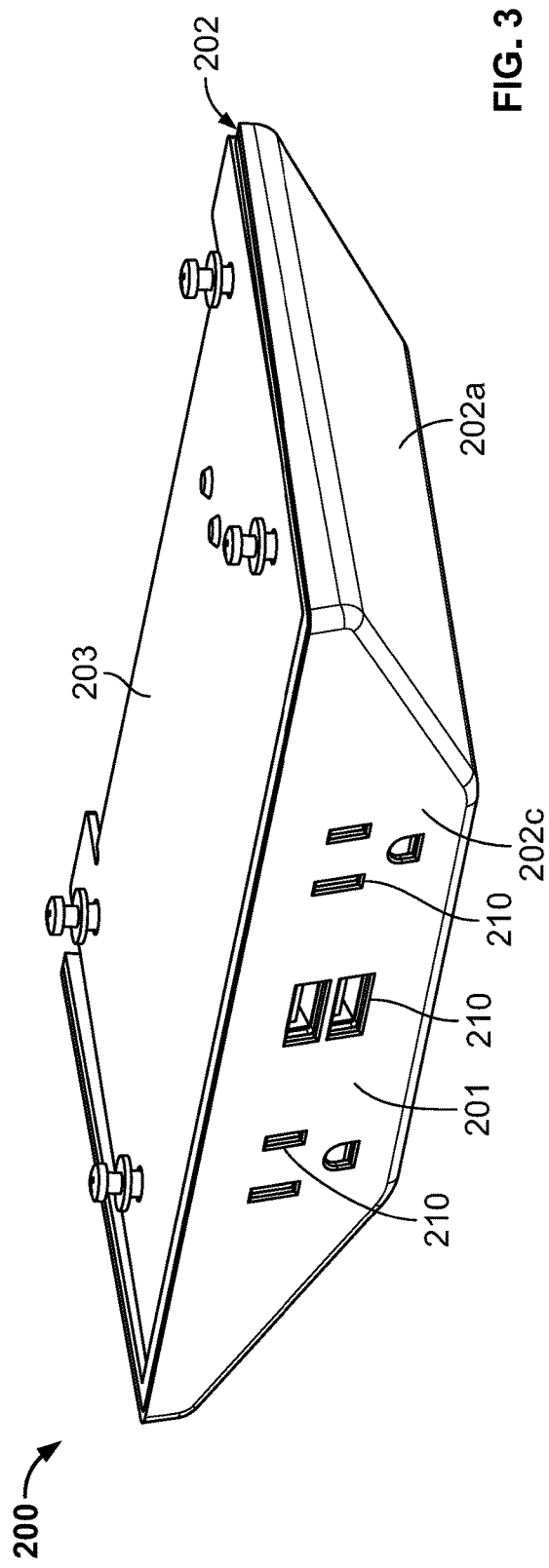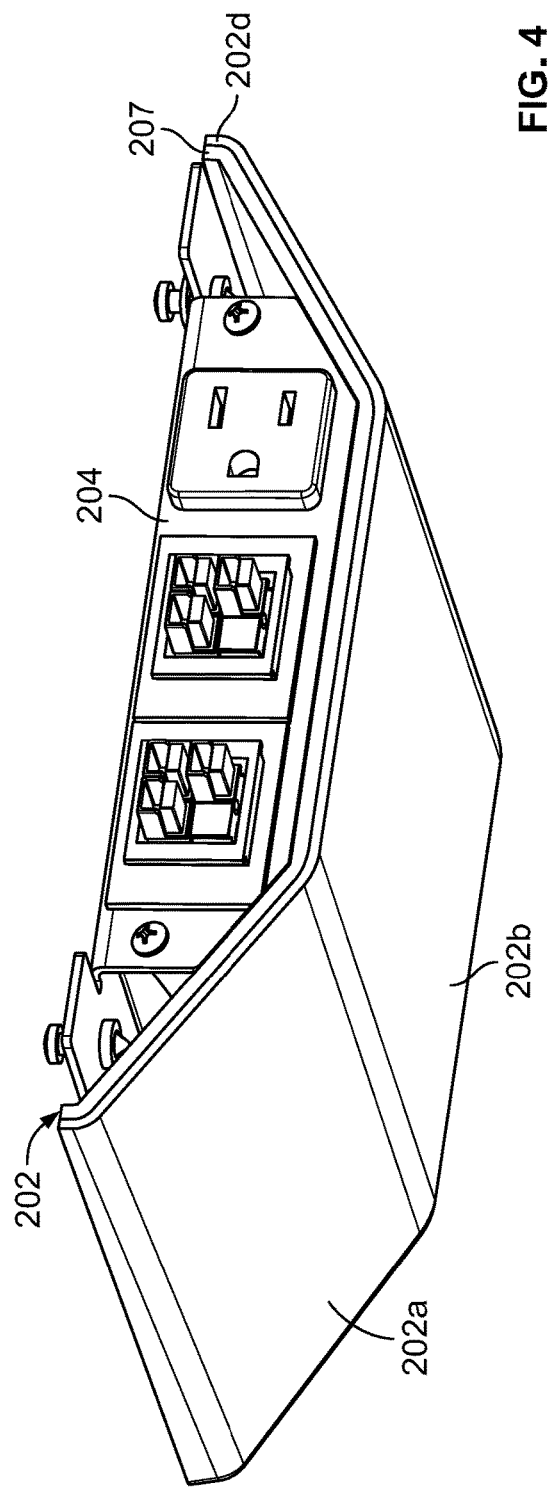

TABLE POWER MODULE DEVICES, SYSTEMS, AND METHODS

TECHNICAL FIELD

This document relates generally to a table apparatus and related devices, systems and, methods, such as a table apparatus including a power module having soft contact surfaces.

BACKGROUND

Tables, desks, and other work surfaces are often used in combination with a chair. Such chairs may be adjustable in height, include arms, or include various characteristics such that the arms and back of the chair can contact the table. For example, height-adjustable chairs are often positioned such that the arms of the chair are parallel to the top surface of the table or slightly below. When a user sits on the height-adjustable chair, such as a spring gas cylinder equipped chair, the chair lowers a certain amount which places the position of the arm(s) below the surface. When leaving the table, the user may spin the seating away from the surface leaving one arm below the surface.

Tables, desks, and other work surfaces, such as those configured for conference rooms, class rooms, meeting rooms, etc., can include electronics connections for connection with a user's electronic device. Various techniques have been proposed for integrating electronic connections with work surfaces, such as providing access through a top, mounting below a table surface, etc.

SUMMARY

Some embodiments described herein include a power module configured to absorb impact and/or otherwise reduce damage to a chair that could result from contact between the power module and chair. For example, a power module may include relatively soft contact surfaces. The contact surfaces may be exposed and/or positioned such that a chair or other object that interacts with the power module contacts the contact surface. The material of the contact surfaces may be selected to reduce scratches, chips, scuffs, or other damage to a chair or the power module. Alternatively or additionally, the contact surfaces provide a durable outer surface of the power module having an extended useful life.

Some example table assemblies may optionally include a table top defining an upper surface, a lower surface, and a table peripheral edge between the upper surface and the lower surface. A power module may be mounted to the table assembly, such as to a lower surface of the table assembly. The power module includes an exposed contact surface of a material that is different than a material of the table top. For example, the lower surface of the table top may include a material that is harder than the material of the contact surface of the power module. In some embodiments, the lower surface of the table top includes a substantially planar surface that is relatively harder, and a power module mounted to the table assembly protrudes outwardly from the lower surface and provides a contact surface that is relatively softer.

Some example table assemblies may include a removably-mountable power module. For example, the power module may be repeatedly removed and reattached with a table top or multiple different table tops, such as when the table assembly is being reconfigured or depending on whether the table assembly requires the power module. In some embodiments, the power module may include a mounting mechanism that facilitates secure attachment to the table assembly without the use of additional tools. For example, the mounting mechanism may include one or more attachment features fixed to the power module complementary to one or more attachment features fixed to the table top. The power module can be securely mounted to a table top (e.g., to a lower surface), without the use of tools or removable fasteners. Moreover, a single power module can optionally be attached to multiple different table tops (e.g., as desired for a particular event, meeting, usage of the table, etc.), or a power module for a given table can be replaced (e.g., at the end of its useful life).

Particular embodiments described herein provide a table assembly including a table top defining an upper surface, a lower surface, and a table peripheral edge between the upper surface and the lower surface, the lower surface including a first material, and a power module removably mounted to the lower surface of the table top. The power module may include a housing having a first front electronics connector and a first rear electronics connector, and an exposed contact surface including a second material. The first material has a first material hardness, the second material has a second material hardness, and the first material hardness is greater than the second material hardness.

In various example embodiments, the table assembly may include all, none, or any combination of the following features. The second material hardness may be between 50 Shore A and 90 Shore A. The first material hardness may be greater than 90 Shore A. The first material hardness may be greater than 100 Shore A. The power module may include a front side, a rear side, a bottom side, a left side, a right side, and a top side, and at least the front side, bottom side, left side, and right side include the second material. The first electronics connector may be located on the front side and the second electronics connector may be located on the rear side. The first and second electronics connectors may include female power receptacles. The power module may include a second electronics connector and a third electronics connector located on the front side of the power module. The second material may be a polyurethane. The second material may include a thermoplastic vulcanizate. The power module may be mounted entirely below the upper surface of the table top such that the power module does not extend outwardly beyond the table peripheral edge. The power module may include a front side, a first electronics connector located on the front side, and wherein at least a top edge of the front side of the power module is flush with the peripheral edge of the table top when the power module is mounted to the lower surface of the table top. The front face of the power module may be angled inwardly from the peripheral edge of the table top. The exposed contact surface including the second material may be configured to protect chairs. The table top may be made of at least one of wood, glass, stone, metal, laminate, and plastic. The electronics connector may include at least one of a power outlet, a USB port, an HDMI port, a VGA port, a video port, an audio port, a serial port, a parallel port a, a DVI port, a printer port, a game port, and an Ethernet port.

Particular embodiments described herein provide a table assembly including a power module having means for absorbing impacts and/or means for removably mounting with a table top without the use of additional tools.

Particular embodiments described herein provide a method including mounting a power module to a lower surface of a table top, the lower surface comprising a first material, the power module having an exposed contact surface including a second material different from the first material. The first material hardness is greater than the second material hardness, the second material configured to absorb impact from a chair.

In various example embodiments, the method may include all, none, or any combination of the following features. Mounting the power module may include mounting the power module to the lower surface such that the first material is exposed proximate at least three sides of the power module. Mounting the power module may include securing the power module to the lower surface of the table top by an integral connector mechanism without the use of tools.

The devices, systems, and techniques described herein may provide one or more of the following advantages. First, some embodiments describe herein provide a table assembly having a power module including a surface that is relatively soft and/or protective of objects that may contact the power module. For example, an exposed contact surface of the power module that is relatively soft may protect chairs and other objects from scratches, scuffs, and other damage that could result from impact or interference between the power module and chair. The table assembly and power module, and chairs used with the table assembly and power module, may thus have an extended useful life in which damage that could degrade the aesthetic appearance or physical performance of these components is reduced. Some example power modules may thus provide access to electronics connections to a user of a table assembly while simultaneously reducing damage to chairs or discomfort to a user that contacts the power module.

Second, some embodiments describe herein provide a power module of a table assembly that facilitates multiple electronics connections. For example, the power module may optionally include one or more of a power outlet, a USB port, an HDMI port, a VGA port, a video port, an audio port, a serial port, a parallel port, a DVI port, a printer port, a game port, and an Ethernet port. These electronics connections can be made available to a user (e.g., for connection of a portable device) while providing protection to chairs that may contact the power module.

Third, some embodiments may provide a table assembly having an aesthetically pleasing and/or sleek appearance. For example, various table assemblies described herein facilitate a table assembly configuration in which a power module is mounted to a lower surface of a table top such that the power module extends downwardly below the lower surface of the table top. The power module thus may be mounted in a position in which electronics connections are readily accessed (e.g., by a user seated at the table assembly), while positioning all electronics connections below the top surface of the table assemblies. Alternatively or additionally, various table assemblies described herein provide a power assembly having a relatively slim profile that can enhance the overall aesthetic appearance of the table assembly, while accommodating adequate space (e.g., knee height) for a user to be comfortably seated at the table assembly in an ergonomic position.

Fourth, some embodiments may provide a power assembly having a soft tactile feel. For example, a power module having relatively soft contact surfaces may provide soft feel that enhances user satisfaction during use of the table. A contact surface of the power module may be slightly compressible and/or have a cushioned feel when contacted by a user's hand during connection of an electrical component. Alternatively or additionally, the exposed contact surfaces of the power module reduce contact between a user's knee/leg and hard surfaces or pointed edges.

Fifth, some embodiments may provide a table assembly having a combination of relatively soft and relatively hard surfaces. In an example embodiment, surfaces that extend outwardly from a lower surface of a table top (e.g., located relatively lower than the lower surface of the table top during use of the table assembly) are relatively softer while the lower surface of the table top (e.g., located relatively higher than exposed contact surfaces of the power module) are relatively harder. Thus, surfaces that may encounter a chair or a user's leg/knee more frequently have a contact surface made from a relatively softer material to protect the chair and electronic components of the power module, and/or promote user comfort when contacted by the user's body.

Sixth, some embodiments may provide a table assembly with modular characteristics. The power module may be readily installed to provide one or more electronics connectors, moved to a desired location on the table assembly, or removed from the table assembly. Alternatively or additionally, a power module may be readily replaced with a power module having different electrical connections or capabilities (e.g., state-of-the-art connections), or at the end of its useful life. In some embodiments, a table assembly may optionally include a removable power module that can be mounted without the use of separate tools.

The details of one or more implementations are set forth in the accompanying drawings and the description below. Other features and advantages will be apparent from the description and drawings, and from the claims.

DESCRIPTION OF DRAWINGS

FIG. 3 is a front perspective view of an example power module.

FIG. 4 is a rear perspective view of the example power module of FIG. 3.

DETAILED DESCRIPTION OF ILLUSTRATIVE EMBODIMENTS

Figure 1:
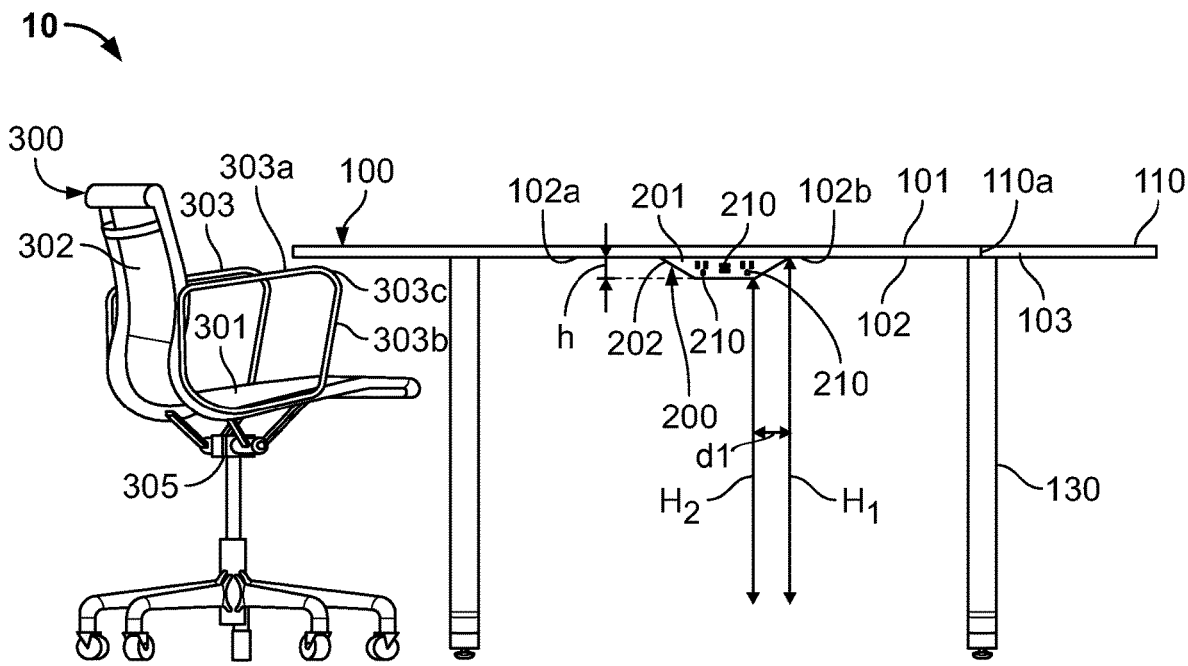
FIG. 1 is a front view of an example table system including a table and chair.

Referring now to FIG. 1, an example table system 10 is shown that includes a table assembly 100 including a power module 200, and a chair 300. Table assembly 100 includes a table top 110 that defines an upper surface 101, a lower surface 102, and a table top peripheral edge 103 between the upper surface 101 and the lower surface 102. Table assembly 100 further includes legs 130 that support and elevate the table top 110. Chair 300 may be a standalone chair 300 that is movable independent of table assembly 100 and that can support a user in a seated position at the table assembly 100.

In various example embodiments, table top 110 can be formed of one or more materials, such as glass, wood, quarried stone, processed stone, metal, plastic, laminated materials, other materials, and/or combinations thereof.

Table top 110 may be a solid material through a thickness of the table top such that that table top 110 includes a solid piece of stone, metal, wood, plastic, etc. In some example embodiments, table top 110 may be in the form of a laminate that includes multiple layers having different performance characteristics and/or thicknesses. Materials of table top 110 may be selected to provide a particular appearance, performance characteristics, etc. The table top 110 may be suitable for use as a conference table, a desk, or other work surface in commercial or residential environments, for example.

Peripheral edge 103 may be an exposed edge of a solid material, exposed edges of multiple layers of a laminate, and/or may be formed by an edge cover that covers or wraps the material of the table top 110, for example. In embodiments in which peripheral edge 103 includes an edge cover, the edge cover may be made from the same material as a material of the upper surface 101 and/or lower surface 102, or may be made from a different material than upper surface 101 and/or lower surface 102. For example, the edge cover may be made from a material that is relatively softer or more forgiving to physical impact as compared to materials of upper surface 101 and/or lower surface 102. The edge cover may provide a protective edge that absorbs impacts from chairs or other objects while reducing damage to table assembly 100 and/or the chairs or other objects.

Chair 300 can optionally include a seat 301 configured to support a user in a seated position at table assembly 100, in combination with any or both of a back 302 and arms 303. In some example embodiments, arms 303 can include an arm rest 303a, arm support 303b and/or an arm edge 303c. For example, arm rest 303a may extend from back 302 substantially horizontally to seat 301, or at an angle to seat 304, such that the arm rest 303a is configured to allow a user to rest an arm on arm rest 303a. Arm support 303b can extend between arm rest 303a and seat 301 and provide arm edge 303c between arm rest 303a and arm support 303b. In some cases, arm edge 303c can be a portion of arm 303 that is located furthest from back 302, such that arm edge 303c may contact other objects such as table top 110 during use of the chair 300. Optionally, chair 300 can be an adjustable-height chair that includes an actuation mechanism 305. Actuation mechanism 305 can be used to modify a height of seat 301, back 302, and/or arms 303. For example, actuation mechanism 305 can move seat 301, back 302, and arms 303 uniformly. Alternatively, actuation mechanism 305 may provide unique actuation of seat 301, back 302, and/or arms 308 separately. In some cases, actuation mechanism 305 can be a spring gas cylinder. In some cases, the height of seat 301, back 302, and/or arms 303 can change slightly when a person sits in chair 300 as compared to when chair 300 is unoccupied. Chair 300 can be rotatable such that the seat 301, back 302, and/or other components of chair 300 can be rotated by a user relative to the legs/ground-engaging components of the chair 300.

Legs 130 of table assembly 100 support and elevate the table top 110. In an example embodiment, legs 130 are attached to the lower surface 102 of table top 110. In some embodiments, legs 130 may be removably attached such that table top 110 and legs 130 may be independently transported and stored. Alternatively or additionally, legs 130 may be removably attachable with table top 110 to facilitate reconfiguration of table assembly 100 (e.g., by attaching legs 130 at one of multiple possible locations along lower surface 102). In an example embodiment, table top 110 may include multiple portions, and legs 130 may be attached proximate (e.g., below/extending across) a joint or seam 110a of table top 110. A single set of legs may thus support multiple portions of table top 110 and/or secure multiple portions of table top 110 to one another.

Power module 200 is attached to table assembly 100 to provide access to one or more electronics connections 210. For example, power module 200 may be attached to lower surface 102 of table top 110. Power module 200 extends (e.g., outwardly) from lower surface 102 of table top 110. Electronics connections 210 thus may be accessible to a user to connect an electronic component, such as a phone, PDA, laptop, or other electronic device, just below the table top 110 for use at table assembly 100.

Electronic connections 210 may include one or more electrical outlet ports and/or USB ports that extend into the power module and configured to receive a complementary electrical plug (e.g., power plug), USB plug, etc. In an exemplary embodiment, the electrical outlet ports/USB ports are flush with a front 201 of power module 200, and the front 201 is flush with peripheral edge 103 of table top 110. In some embodiments, front 201 is slightly recessed inwardly of peripheral edge 103, such that the electrical ports are located inwardly of peripheral edge 103. For example, the front 201 may be located inwardly of peripheral edge 103 by between about 1 mm and 50 mm, 2 mm and 25 mm, or about 5 mm.

In various exemplary embodiments, electronic connections 210 may, alternatively or additionally, include HDMI ports, VGA ports, video ports, audio ports, serial ports, parallel ports, DVI ports, printer ports, game ports, Ethernet ports, mini or micro ports of such connections, and any combination thereof.

Power module 200 may be configured to prevent interaction with chair 300 or other furniture used with table assembly 100 that could result in visible damage. For example, power module 200 may include an exposed contact surface 202 made from a material that prevents damage to chair 300 and/or power module 200. Contact surface 202 of power module 200 may be made of material that is resistant to damage such as scratches, dents, chips, etc., and that likewise prevents such damage to chair 300, that may otherwise result from impact. In an example embodiment, the contact surface 202 is an exposed surface (e.g., an outermost surface likely to make first contact with chair 300) that is made of a relatively soft and/or resilient material.

Figure 2:
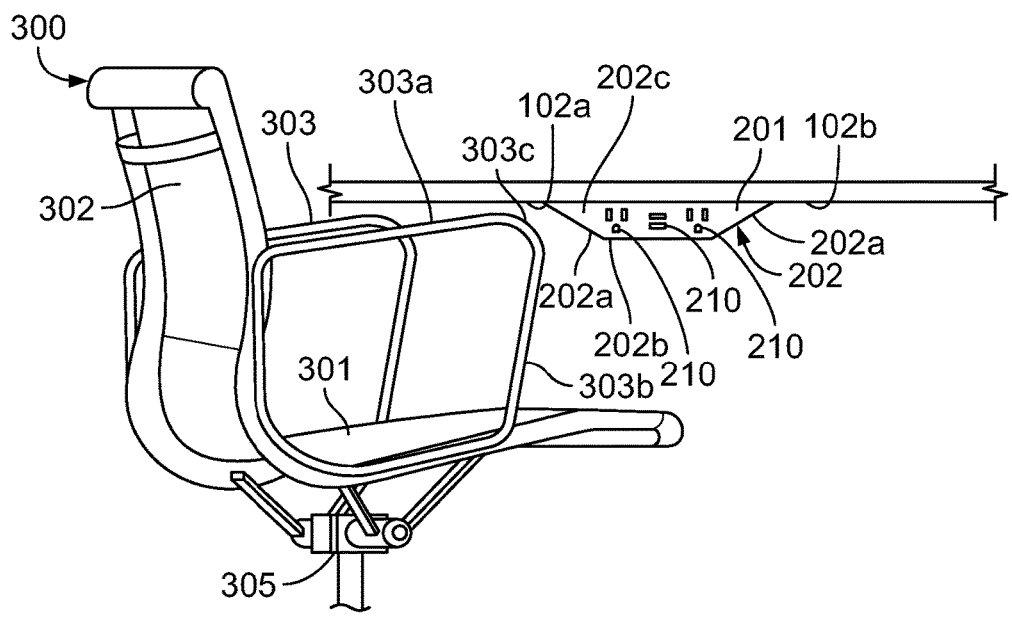
FIG. 2 is an enlarged view of a power module and chair of the example table system of claim 1.

Still referring to FIGS. 1 and 2, contact surfaces 202 may be contacted by arm 303 (e.g., arm edge 303c) of chair 300 during normal use of table system 10. For example, when chair 300 is pushed under table assembly 100 after use, or when chair 300 is moved inwardly to accommodate a user seated at table assembly 100, a portion of chair 300 may contact power module 200. The contact surfaces 202 are configured to mitigate potential damage resulting from such contact. For example, contact surfaces 202 of power module 200 can protect chair 300 (and itself) from damage caused by an impact at power module 200. Contact surfaces 202 are configured to protect chair 300 and power module 200 from damage due to horizontal forces, such as an arm 303 being pushed into power module 200, rotational forces, such as rotation of chair 300 causing arm 303 to contact power module 200, vertical forces, such as when a height of the arm 303 increases due to a person leaving chair 300 or actuating chair 300 to increase the height, and combinations of such forces.

In an example embodiment, contact surface 202 is made of a material that is resistant to damage (e.g., scratches, dents, chips, etc.) caused by impact and/or that has cushioning or dampening characteristics in response to impact forces. Contact surface 202 can be made of a soft, resilient material. Alternatively or additionally, such materials may be selected to have an outer surface or appearance that is configured to blend with, or complement, the outer decorative appearance of the table top 110 or other aesthetic characteristics of table system 10. In an example embodiment, contact surface 202 is made from a urethane material, polyurethane material, thermoplastic vulcanizate, other polymer, cork, leather, combinations thereof, etc. For example, contact surface 202 may be made from DESMOPAN available from Covestro, or SANTOPRENE available from ExxonMobil.

In an example embodiment, contact surface 202 is made from a material different than an exposed portion of lower surface 102 of table top 110. For example, an exposed portion of lower surface 102 may be made of a first material and contact surface 202 may be made of a second material different than the first material. The first and second materials may have one or more characteristics that differ from one another, including hardness, texture, color, strength, rigidity, elasticity, etc. For example, the first material of lower surface 102 may have a hardness that is greater than the material of contact surface 202. In various exemplary embodiments, the second material that contact surface 202 is made from may have a Shore A hardness between 50 and 90, 60 and 85, or about 80 Shore A. In various exemplary embodiments, the first material that an exposed portion of lower surface 102 is made from may have a Shore A hardness greater than 90, greater than 100, or higher, such as between 90 Shore A and 90 Shore D, 90 Shore A and 70 Shore D, for example. A contact surface 202 made from a second material having a hardness within such ranges provides resistance to damage to chair 300 and power module 200 and a surface that may feel soft to a user, while providing a highly durable and wear-resistant contact surface having an extended useful life. Hardness may be measured according to ASTM D2240 (2015), for example.

The first material that lower surface 102 is made from and the second material that contact surface 202 is made from may provide distinct tactile sensations when touched by a user. For example, first material may be sufficiently harder than the second material such that a user readily senses that the second material is softer and/or more compressible as compared to the first material. The user thus may readily perceive the protective characteristics of contact surface 202 from impact by chair 300, and/or perceive that the contact surface 202 would minimize contact between the user's knee/leg and rigid or hard edges of power module 200, from the perceptible softness of contact surface 202.

In an example embodiment, power module 200 is at least partially surrounded by a material that is harder than the contact surface 202. For example, the power module 200 is surrounded on opposite sides by exposed portions 102a and 102b of lower surface 102 made from the first material, and surrounded to the rear by an exposed portion of lower surface similarly made of the first material. The lower surface 102 that the power module is attached to, and that surrounds the power module 200 (e.g., on at least three sides adjacent the power module 200) is made from the first material that is harder than the second material that the contact surface 202 is made from. Portions of the table system 10 that are lower and relatively more likely to encounter contact with chair 300 or a user's knee/leg are relatively softer, while portions of the table system 10 that are higher and relatively less likely to encounter contact with chair 300 or a user's knee/leg are relatively harder. Such construction of the table system 10 may promote durability and limit wear or damage to the chair 300, while facilitating material selection and construction of table top 110 based primarily on performance and aesthetic characteristics of table top 110.

The power module 200 may be mounted or otherwise affixed to the table assembly 100 such that a lower surface of power module is located at a different height than lower surface 102 of table top 110. For example, a distance between the lower surface 102 (e.g., proximate power module 200) and a floor that supports table assembly 100 may define a first height H1, and a distance between a lower-most portion of power module 200 and the floor may define a second height H2. The first height H1 is greater than the second height H2 such that the power module extends downwardly below the lower surface 102 of table top 110. In an example embodiment, a difference between the first height H1 and the second height H2 is equal to a height h that the power module 200 extends downwardly below the lower surface 102. In some example embodiments, the power module 200 abuts the lower surface 102 of table top 110 such that the height h is equal to an overall height of the power module. Alternatively, in some example embodiments, the power module may be partially nested within a recess in the lower surface 102 such that height h is less than an overall height of the power module 200.

In various exemplary embodiments, the geometry of the power module 200 is configured to reduce the likelihood of visible damage caused by contact with chair 300. In an example embodiment, contact surface 202 includes side portions 202a, bottom portion 202b, front portion 202c, and/or rear portion 202d. The side portions 202a may be angled relative to bottom portion 202b and/or the lower surface 102 of table top 110. The side portions 202a may be angled such that a horizontal width (d1) of the side portions 202a is greater than the height h of the power module 200. For example, the side portions may be angled less than 45° relative to the lower surface 102 of table top 110. In some embodiments, the side portions 202a may be angled such that the horizontal width (d1) of the side portions 202a is less than the height h of the power module 200. For example, the side portions may be angled greater than 45° relative to the lower surface 102 of table top 110. In some embodiments, the side portions 202a may be angled such that the horizontal width (d1) of the side portions 202a is about equal to the height h of the power module 200. For example, the side portions may be angled about 45° relative to the lower surface 102 of the table top 110. Alternatively or additionally, the front portion 202c may be angled inwardly (e.g., angled inwardly less than an angle of side portions 202a). The force of an impact from the arm 303 of chair 300 at angled side portions 202a (and/or front portion 202c) may be partially absorbed and directed upwards towards table top 110. Additionally, the angled side portions 202a may contribute to a streamlined overall appearance and/or the perception of a seamless interface between power module 200 and table top 110. Alternatively or additionally, power module may have rounded or chamfered edges that reduce distinct edges and further reduce the likelihood of damage resulting from impact at these locations of the power module 200.

The contact surface 202 may cover most or all of the exposed portions of the power module 200 (e.g., when the power module is affixed to table assembly 100). For example, contact surface 202 may make up 75% or more of the exposed portions of the power module 200. In an example embodiment, between 75% and 100%, between 85% and 100%, or between 95% and 100% of the exposed portions of the power module 200 are covered by the contact surface 202. Such coverage by the contact surface 202 provides impact protection from a wide range of directions and from a wide range of chairs, or other objects that may impact power module 200.

Referring now to FIGS. 3 and 4, a front perspective view (FIG. 3) and a rear perspective view (FIG. 4) of example power module 200 is shown. The power module 200 includes an exposed contact surface 202 and a top surface 203. In an example embodiment, contact surface 202 includes side portions 202a, bottom portion 202b, and front portion 202c. The side portions 202a may be angled relative to bottom portion 202b. For example, the top surface 203 may have a larger surface area than bottom portion 202b. Alternatively or additionally, the front portion 202c may be angled inwardly from the top surface 203 to the bottom portion 202b (e.g., angled inwardly less than an angle of side portions 202a). In an example embodiment, contact surface 202 may include a rear portion 202d that does not cover an entire portion of a rear of the power module. The rear 204 of the power module may be relatively less likely to encounter contact with a chair, user's body, or other object, and thus may be less likely to result in damage. Alternatively, in some example embodiments, contact surface 202 may include a rear portion 202d that covers substantially all of the rear 204 of the power module (e.g., except for electronic connections).

Electronic connections 210 located at a front 201 of the power module 200 may include one or more electrical outlet ports and/or USB ports that extend into the power module and that are configured to mate with a complementary electrical plug, such as a power plug, USB plug, etc. In an example embodiment, power module includes an arrangement of a first electrical outlet 211 and a second electrical outlet 212 spaced from the first electrical outlet. Additionally, the electrical connections include a first USB port 213 and a second USB port 214 located below the first USB port 213. Electronic connections 210 thus include two USB ports 213, 214 located between two electrical outlets 211, 212, and each of the electronic connections 210 are located a fixed distance relative to one another and relative to a top surface of a table top when the power module 200 is attached to the table top.

Alternatively or additionally, electronic connections 210 may include HDMI ports, VGA ports, video ports, audio ports, serial ports, parallel ports, DVI ports, printer ports, game ports, Ethernet ports, mini or micro ports of such connections, and any combination thereof Electronic connections 210 located at the rear 204 may include one or more electrical outlet ports and/or USB ports that extend into the power module and that are configured to mate with a complementary electrical plug, such as a power plug, USB plug, etc. For example, an electrical outlet 215 may be configured to receive a complementary power plug connected to a source of power. Various electrical connectors and circuit components may be located within the power module 200 and/or extending between electronic connections 210 located at the front and rear 201, 204, of the power module. For example, various electrical connectors and or circuit components may provide electrical connection between electrical outlet 215 and each of electrical outlets 211, 212 such that a source of power connected to electrical outlet 215 may be accessed via electrical outlets 211, 212.

In an example embodiment, contact surface 202 may be defined by an outer material layer supported by an inner shell or frame made from a different material. For example, the power module 200 may include a shell 207 made from a material that is relatively harder, more rigid, etc., as compared to a material that contact surface 202 is made from. Accordingly, shell 207 may facilitate a defined structure in which electronic components may be housed, and may facilitate secure attachment to a table assembly, while contact surface 202 may be laminated, adhered, or otherwise attached to at least portions of the shell 207 to provide a soft, protective surface.

Top surface 203 may be configured to facilitate attachment with a table assembly. In an exemplary embodiment, top surface 203 includes a relatively planar surface that facilitates attachment with a table assembly (e.g., a lower surface of a table assembly). In an exemplary embodiment, top surface 203 is substantially solid such that the power module 200 defines an enclosure for electronic components within the power module 200. Alternatively, in some embodiments, top surface 203 is not solid, and a top of the power module 200 includes openings, or is substantially open (e.g., such that a lower surface of a table assembly defines portions of the top of the enclosure.

The power module 200 includes one or more connectors that facilitate attachment with a table assembly, such as a lower surface of a table assembly. In an example embodiment, the power module 200 includes one or more connectors 220 extending upwardly away from top surface 203. The connectors 220 may include screws or a flanged connector sized to interact with a complementary feature of the table assembly. Alternatively or additionally, connectors 220 may include one or more female receptacles that interact with a complementary male feature of the table assembly. Moreover, connectors 220 may include one or more snap-fit features, threaded fasteners, tongue-and-groove fasteners, keyed slots, etc., that facilitate attachment with the table assembly.

In an example embodiment, the front and rear 201, 204 of the power module 200 have a generally trapezoidal shape, including top and bottom edges generally parallel to one another and to a table top to which the power module 200 may be attached. In various exemplary embodiments, the power module may exhibit a generally hemispherical, elliptical, quadrilateral, rectangular, square, or other shape. For example, the power module 200 may have a generally arcing contact surface 202 such that the contact surface 202 is generally continuous and free from edges, corners, or distinct sides.

Figure 5:
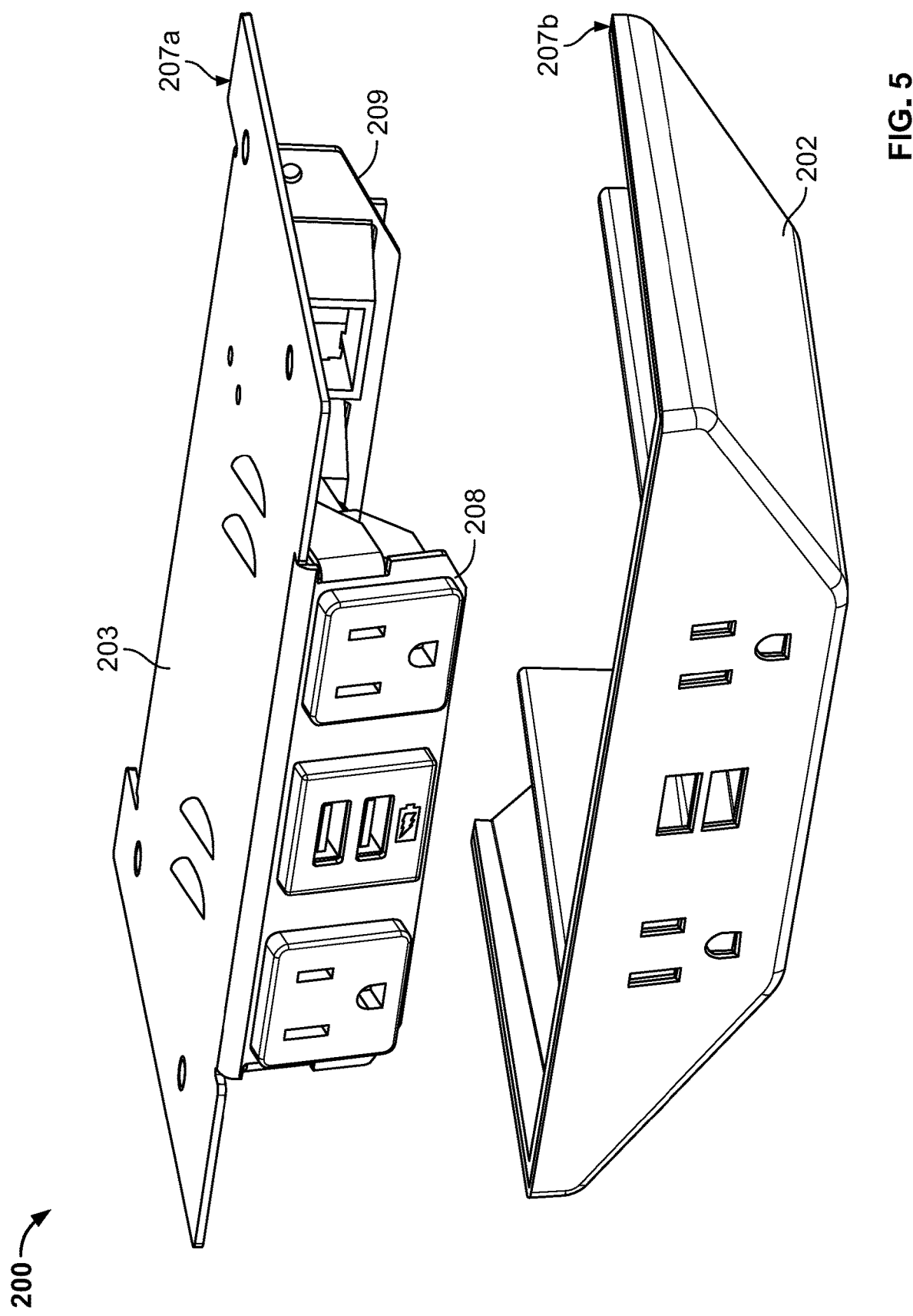
FIG. 5 is a partial exploded view of the example power module of FIG. 3.

Referring now to FIG. 5, a partial exploded view of the example power module 200 of FIGS. 3 and 4 is shown. The shell 207 of power module 200 includes first and second shell portions 207a and 207b that at least partially define an enclosure for electronic components of power module 200. In an example embodiment, first shell portion 207a includes top surface 203 and electronic component portions 208, 209 that extend (e.g., perpendicularly, such as substantially perpendicularly within +/−10 of exactly perpendicularly) from the top surface 203. The second shell portion 207b is configured to at least partially receive electronic component portions 208, 209. For example, second shell portion 207b includes openings 217 through which electronic component portions 208, 209 may be accessed.

In an example embodiment, second shell portion 207b includes contact surfaces 202. For example, a relatively soft material that defines contact surface 202 substantially covers outer surfaces of second shell portion 207b. In some embodiments, contact surface 202 is defined entirely by second shell portion 207b. For example, the relatively soft material that defines contact surface 202 is present only on second shell portion 207b, and first shell portion does not include an exposed surface made from the same relatively soft material.

Figure 6A:
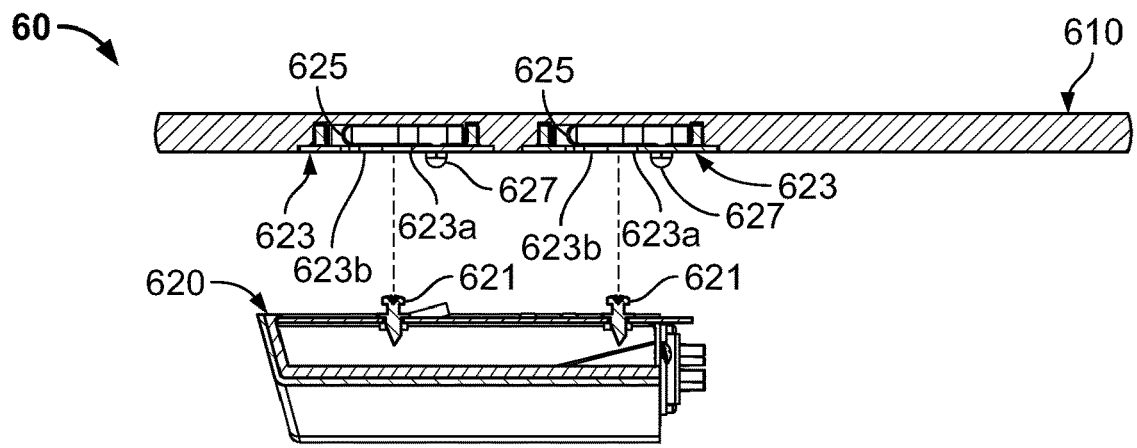
FIGS. 6A-6C are partial, cross-sectional views showing engagement between an example power module and table top.
Figure 6B:
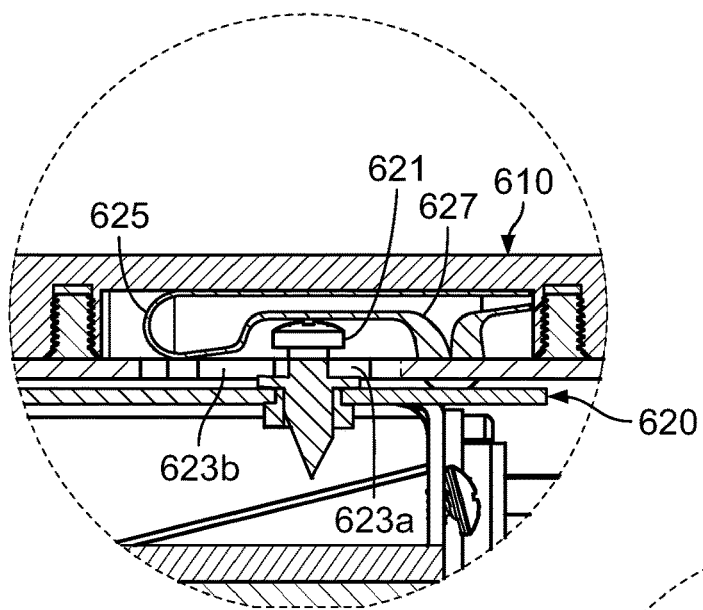
Figure 6C:
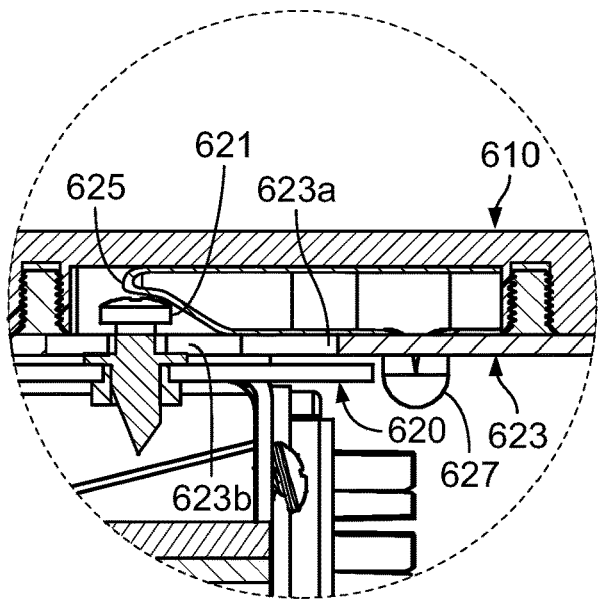

Referring now to FIGS. 6A-6C, partial cross-sectional views are shown of engagement between an example table top 610 and power module 620 of table system 60. In various example embodiments, table system 60, table top 610, and power module 620 may have one or more features described above with reference to table system 10, table top 110, and power module 200.

Table system 60 facilitates efficient and secure engagement between the table top 610 and the power module 620. In an example embodiment, power module 620 may be securely attached to, and/or removed from, table top 610 without the use of additional tools (e.g., without the use of a screwdriver, wrench, removable fasteners, etc.). The power module 620 includes one or more connectors 621 that extend from a surface of the power module. For example, the power module 620 may be configured to be attached to a lower surface 612 of the table top 610, and may include multiple connectors 621 that extend upwardly from a top surface of the power module. In an example embodiment, connectors 621 include shoulder screws installed into threaded holes through a top of the power module 620.

The table top 610 includes complementary receptacles 623 configured to receive at least portions of the connectors 621. In an example embodiment, the complementary receptacles 623 include a keyed slot having a wide portion 623a sized to accommodate a wide portion of connector 621 (e.g., head of a shoulder screw) and a narrow portion 623b having a width less than the wide portion of connector 621. In some example embodiments, a spring detent 625 is located at least partially within the complementary receptacles 623, and may include a manually actuatable end or tab 627 that may be manually actuatable by a user.

During installation, the connectors 621 may be inserted through the wide portion 623a of the keyed slots and partially compress the spring detent 625 (FIG. 6B). The power module 620 may then be slid along the slot such that the connectors 621 move along the keyed slots. The greater width of a head of the connectors 621, for example, and the relatively narrow portion 623b of the keyed slot prevent the connectors 621 from passing through the narrow portion 623b of the slot, and the spring detent prevents lateral movement of connectors 621 towards the wide portion 623a. In this way, power module 620 may be securely affixed to the table top 610.

To remove the power module 620 from table top 610, a user may manually actuate the end or tab 627 to allow the connectors 621 to slide in the receptacles 623 toward wide portions 623a. The connectors 621 may then pass through the wide portions 623a to release the power module 620. In an exemplary embodiment, the power module 620 is securely attached with the table top 610 by engagement between connectors 621 and receptacles 623 such that a force imparted on power module 620 when a plug is connected to a power module 620, or when impacted by a chair, does not cause the power module 620 to inadvertently release from the table top 610. For example, the spring detent may prevent inadvertent lateral movement of the power module 620 relative to the table top 610 until the end or tab 627 is manually actuated by a user.

Figure 7:
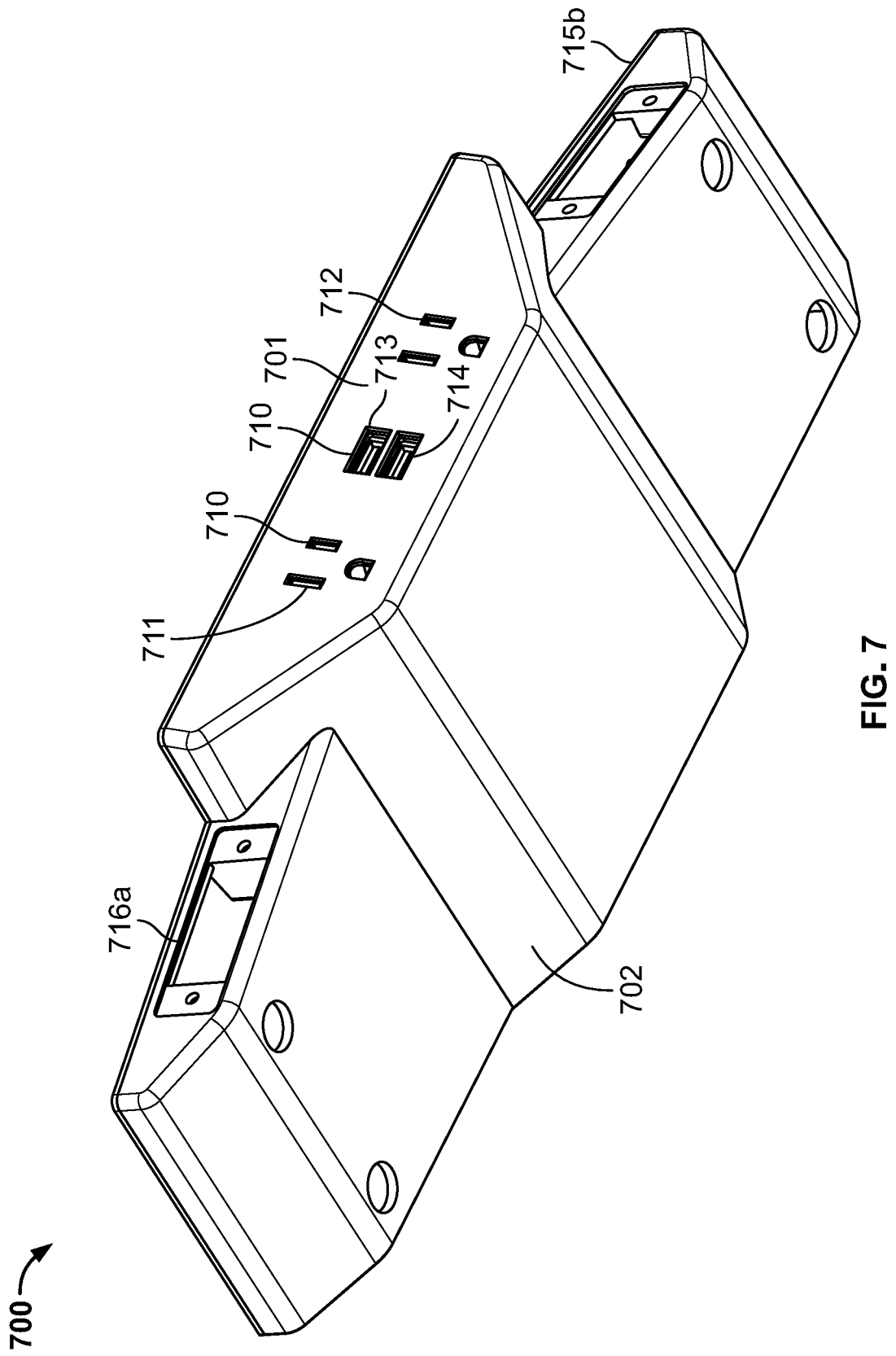
FIG. 7 is a front perspective view of another example power module.

Referring now to FIG. 7, an example power module 700 is shown including multiple electronics connections. Power module 700 may be attached to a table assembly to provide access to one or more electronics connections 710. For example, power module 700 may be attached to lower surface of a table top. Electronics connections 710 thus may be accessible to a user to connect an electronic component, such as a phone, PDA, laptop, or other electronic device, just below the table top for use at table assembly. The power module 700 may thus provide electronics connections while reducing damage to chairs or other objects and promoting comfort for a user that may contact power module 700. In various example embodiments, power module 700 may include one or more features described herein with reference to power module 200 or power module 620, for example.

Electrical connections 710 may include one or more electrical outlet ports, and/or USB ports that extend into the power module and configured to receive a complementary electrical plug (e.g., power plug), USB plug, data component, etc. In an exemplary embodiment, the ports are flush with a front surface portion 701 of power module 700. In various exemplary embodiments, electrical connections 710 may, alternatively or additionally, include HDMI ports, VGA ports, video ports, audio ports, serial ports, parallel ports, DVI ports, printer ports, game ports, Ethernet ports, mini or micro ports of such connections, and any combination thereof.

The power module 700 may additionally include electrical connections 715. For example, the power module 700 may include data ports 715a, 715b, located a fixed distance on opposing sides of electronic connections 710. The data ports 715a, 715b, may provide additional connections beyond electronic connections 710, and in some embodiments provide different electronics connections (e.g., to provide different functionality compared to electronic connections 710). In an example embodiment, power module includes an arrangement of a first electrical outlet 711 and a second electrical outlet 712 spaced from the first electrical outlet. Additionally, the electrical connections include a first USB port 713 and a second USB port 714 located below the first USB port 713. Electrical connections 710 thus include two USB ports 713, 714 located between two electrical outlets 711, 712, and each of the electrical connections 710 are located a fixed distance relative to one another and relative to a top surface of a table top when the power module 700 is attached to the table top. Alternatively or additionally, the power module includes data ports 715a, 715b spaced a fixed distance from first electrical outlet 711/second electrical outlet 712 and/or first USB port 713/second USB port 714. In various example embodiments, electronic connections 210 and data ports 715a, 715b may include HDMI ports, VGA ports, video ports, audio ports, serial ports, parallel ports, DVI ports, printer ports, game ports, Ethernet ports, mini or micro ports of such connections, and any combination thereof.

The power module 700 may be readily attached to a table assembly, such as the lower surface of the table assembly. In some example embodiments, the power module 700 may be attached without the use of additional tools. The power module 700 thus can provide multiple ports and connections for a range of electronic connection functionality while still being readily mountable and removable to a table assembly.

The power module 700 may be configured to reduce the likelihood of damage from interaction between a chair or other objects used with power module 700. For example, the power module 700 may include an exposed contact surface 702 made from a material that prevents damage to a chair and/or the power module 700. The contact surface 702 of power module 700 may be made of material that is resistant to damage such as scratches, dents, chips, etc., and that likewise prevents such damage to a chair, that may otherwise result from impact. In an example embodiment, the contact surface 702 is an exposed surface (e.g., an outermost surface likely to make first contact with the chair).

In an example embodiment, contact surface 702 is made of a relatively soft material that is resistant to damage (e.g., scratches, dents, chips, etc.) caused by impact and/or that has cushioning or dampening characteristics in response to impact forces. The contact surface 702 may be made from a urethane material, polyurethane material, thermoplastic vulcanizate, other polymer, cork, leather, combinations thereof, etc., for example. In an example embodiment, contact surface 202 may be made from DESMOPAN available from Covestro, or SANTOPRENE available from ExxonMobil. In various exemplary embodiments, the contact surface 702 is made from a material may have a Shore A hardness between 50 and 90, 60 and 85, or about 80 Shore A.

The contact surface 702 may cover most or all of the exposed portions of the power module 700 (e.g., when the power module is affixed to table assembly 100). For example, contact surface 702 may make up 75% or more of the exposed portions of the power module 700, such as 75% or more of the surfaces of the power module 700 other than a top surface that abuts a lower surface of a table top, for example. In an example embodiment, between 75% and 100%, between 85% and 100%, or between 95% and 100% of the exposed portions of the power module 700 are covered by the contact surface 702. Such coverage by the contact surface 702 provides impact protection from a wide range of directions and from a wide range of chairs, or other objects that may impact power module 700.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A table assembly, comprising:
a table top defining an upper surface, a lower surface, and a table peripheral edge between the upper surface and the lower surface, the lower surface including a table top material; and
a power module removably mounted to the lower surface of the table top such that a first front electronics connector along a front side of the power module is entirely below the lower surface of the table top, the power module comprising:
a rigid housing having the first front electronics connector and a first rear electronics connector, and
a cushion shell that surrounds at least a portion of the rigid housing of power module and defines an exposed lower exterior of the power module along at least the front side, a bottom side, a left side, and a right side of the power module such that the cushion shell covering is exposed below the lower surface of the table top;
wherein the table top material has a first material hardness, the cushion shell has a second material hardness, and the first material hardness is greater than the second material hardness.

2. The table assembly of claim 1, wherein the second material hardness is between 50 Shore A and 90 Shore A.

3. The table assembly of claim 2, wherein the first material hardness is greater than 90 Shore A.

4. The table assembly of claim 2, wherein the first material hardness is greater than 100 Shore A.

5. The table assembly of claim 1, wherein the power module includes the front side, a rear side, the bottom side, the left side, the right side, and a top side, and the cushion shell is exposed along at least the front side, bottom side, left side, and right side.

6. The table assembly of claim 5, wherein the first front electronics connector is located on the front side and the first rear electronics connector is located on the rear side.

7. The table assembly of claim 6, wherein the first front electronics connector and first rear electronics connectors comprise female power receptacles.

8. The table assembly of claim 6, further comprising a second electronics connector and a third electronics connector located on the front side of the power module.

9. The table assembly of claim 1, wherein the cushion shell comprises a polyurethane.

10. The table assembly of claim 1, wherein the cushion shell comprises a thermoplastic vulcanizate.

11. A table assembly, comprising:
a table top defining an upper surface, a lower surface, and a table peripheral edge between the upper surface and the lower surface, the lower surface including a first material; and
a power module removably mounted to the lower surface of the table top, the power module comprising:
a housing having a first front electronics connector and a first rear electronics connector, and
an exposed contact surface including a second material;
wherein the first material has a first material hardness, the second material has a second material hardness, and the first material hardness is greater than the second material hardness; and
wherein the power module is mounted entirely below the upper surface of the table top such that the power module does not extend outwardly beyond the table peripheral edge.

12. The table assembly of claim 11, wherein the power module includes a front side, a first electronics connector located on the front side, and wherein at least a top edge of the front side of the power module is flush with the peripheral edge of the table top when the power module is mounted to the lower surface of the table top.

13. The table assembly of claim 12, wherein the front face of the power module is angled inwardly from the peripheral edge of the table top.

14. The table assembly of claim 1, wherein the exposed cushion shell is configured to protect chairs below the lower surface of the table top.

15. The table assembly of claim 1, wherein the table top material comprises at least one of wood, glass, stone, metal, laminate, and plastic.

16. The table assembly of claim 1, wherein the first front electronics connector comprises at least one of a power outlet, a USB port, an HDMI port, a VGA port, a video port, an audio port, a serial port, a parallel port a, a DVI port, a printer port, a game port, and an Ethernet port.

17. A table assembly, comprising:
a power module having at least one electronics connector and a rigid housing extending below a table top, the power module including:
means for absorbing impacts and surrounding at least a portion of the rigid housing extending downwardly below the table top, and
means for removably mounting with a table top so that the power module is entirely positioned directly below a solid upper surface of table top without the use of additional tools.

18. A method, comprising:
mounting a power module to a lower surface of a table top such that a top side of the power module and a first electronics connector along a front side of the power module are entirely below an upper surface of the table top, the power module having an exposed cushion shell covering at least the front side, a bottom side, a left side, and a right side of the power module such that the cushion shell covering is exposed below the lower surface of the table top, the exposed cushion shell covering including a compressible cushion material different from a rigid material along the lower surface of the table top;
wherein the rigid material along the lower surface of the table top has a hardness greater than the compressible cushion material, the compressible cushion material configured to absorb impact from a chair.

19. The method of claim 18, wherein mounting the power module comprises mounting the top side of the power module to abut with the lower surface such that the rigid material along the lower surface of the table top is exposed proximate at least three sides of the power module.

20. The method of claim 19, wherein mounting the power module comprises securing the power module to the lower surface of the table top by an integral connector mechanism without the use of tools.

* * * * *